(12) United States Patent
Linger

(10) Patent No.: US 7,918,476 B1
(45) Date of Patent: Apr. 5, 2011

(54) STOWABLE HITCH

(75) Inventor: Don F. Linger, Stockton, CA (US)

(73) Assignee: Valley Towing Products, Rochester Hills, MI (US)

( * ) Notice: Subject to any disclaimer, the term of this patent is extended or adjusted under 35 U.S.C. 154(b) by 1182 days.

(21) Appl. No.: 11/144,082

(22) Filed: Jun. 3, 2005

Related U.S. Application Data

(63) Continuation-in-part of application No. 10/860,186, filed on Jun. 3, 2004, now abandoned.

(51) Int. Cl.
*B60D 1/06* (2006.01)
*B60D 1/52* (2006.01)

(52) U.S. Cl. ............... 280/511; 280/491.5; 280/901

(58) Field of Classification Search ........... 280/491.1, 280/491.2, 491.5, 433, 511, 415.1, 416.1, 280/901
See application file for complete search history.

(56) References Cited

U.S. PATENT DOCUMENTS

| 2,639,160 | A | * | 5/1953 | Studebaker et al. | 280/495 |
| 5,016,898 | A | | 5/1991 | Works et al. | |
| 5,104,138 | A | | 4/1992 | Allen | |
| 5,472,222 | A | | 12/1995 | Marcy | |
| 6,409,202 | B1 | * | 6/2002 | Putnam | 280/495 |
| 6,520,528 | B2 | * | 2/2003 | Fandrich et al. | 280/496 |
| 2004/0160037 | A1 | | 8/2004 | Dick | |

FOREIGN PATENT DOCUMENTS

GB 1548991 * 7/1979

* cited by examiner

*Primary Examiner* — Anne Marie M Boehler
(74) *Attorney, Agent, or Firm* — Novak Druce + Quigg LLP

(57) ABSTRACT

A hitch assembly comprises housing that includes a generally cylindrical socket with an inner diameter and a slot along an outer periphery of the socket. A hitch ball includes a base that is selectively received within the socket. The base includes a radial groove that generally aligns with the slot. A sliding member selectively engages the slot and the radial groove to retain the hitch ball within the socket.

16 Claims, 12 Drawing Sheets

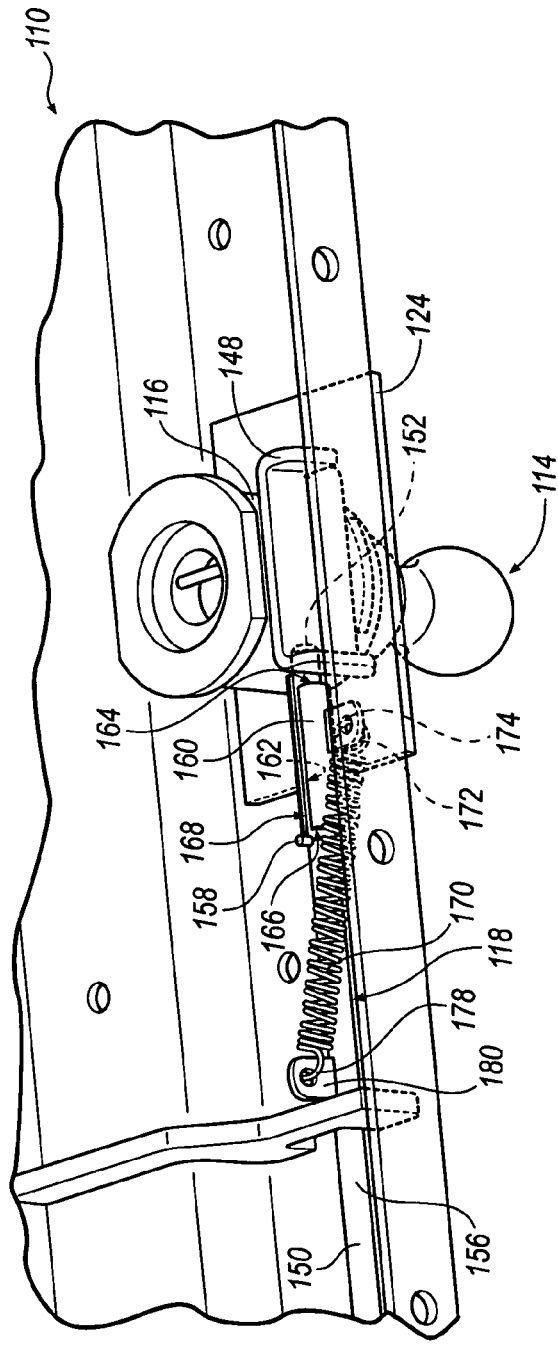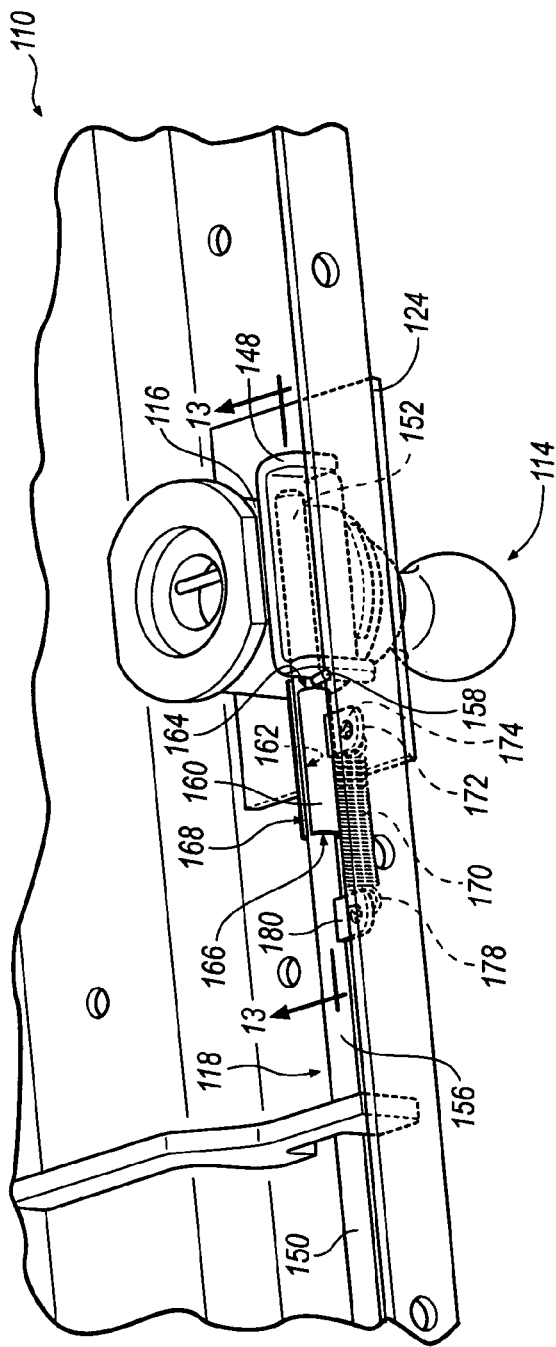

STOWABLE HITCH

CROSS REFERENCE TO RELATED APPLICATIONS

This application claims priority to application Ser. No. 10/860,186, filed on Jun. 3, 2004 now abandoned, the contents of which are hereby incorporated by reference herein in their entirety.

FIELD OF THE INVENTION

The invention relates to ball type hitch assemblies for removably coupling a trailing object, such as a boat, to a structural member or hitch of a towing vehicle, and in particular to a hitch assembly having a hitch ball that is retained in a socket by a sliding bar.

DESCRIPTION OF THE RELATED ART

Ball type hitches are commonly used in the towing of various types of vehicles, trailers, and the like (hereinafter referred to collectively as "trailers"). Trailers range in size from larger and heavier cargo and camping trailers down to smaller utility trailers. Commonly, trailers that are hauled by automobiles are used on an intermittent basis. Therefore, the towing vehicle and the trailer are configured with interlocking hitch components in order to enable coupling and decoupling of the trailer and towing vehicle as required.

Many conventional hitch assemblies have a hitch with a square base and a square socket to engage the hitch. Therefore, once inserted into the socket, the hitch cannot rotate within the socket. However, even conventional hitch assemblies that have cylindrical bases and cylindrical sockets do not allow the hitch to rotate once secured to the socket. Typically, a pin passes through a hole in the socket and engages a hole on the base of the hitch. As a result, the hitch is not able to rotate within the socket once the pin is engaged. Moreover, the base of the hitch and the socket must be properly aligned in order for the pin to properly engage the hitch within the socket. Furthermore, the hitch assembly results in a pin that is in 'single shear'. That is, an area roughly equivalent to the area of the pin taken normal to the axis of the pin resists shear pullout of the hitch.

In order to overcome the foregoing problem, it is known to replace the hole in the base of the hitch with a groove. The pin passes through the hole in the socket and engages the groove at a small point of contact. While the hitch may be able to rotate within the socket, there is limited bearing surface contact between the pin and the groove. Since the trailer and the hitch assembly are subject to vibrational forces during transportation, accidental separation is possible under certain load and operational conditions. Thus, known conventional hitch assemblies do not allow the hitch to rotate freely while providing significant contact between the pin and the hitch.

SUMMARY OF THE INVENTION

A hitch assembly comprises a generally cylindrical socket with an inner diameter and a slot along an outer periphery of the socket. A hitch ball is selectively received within the socket and a housing receives the socket. A sliding member selectively engages the slot to retain the hitch ball within the socket.

BRIEF DESCRIPTION OF THE DRAWINGS

FIG. 11 is a partial perspective view from below of the hitch assembly of FIG. 10.

FIG. 12 is a partial perspective view similar to FIG. 11.

DESCRIPTION OF THE PREFERRED EMBODIMENT

Figure 1:
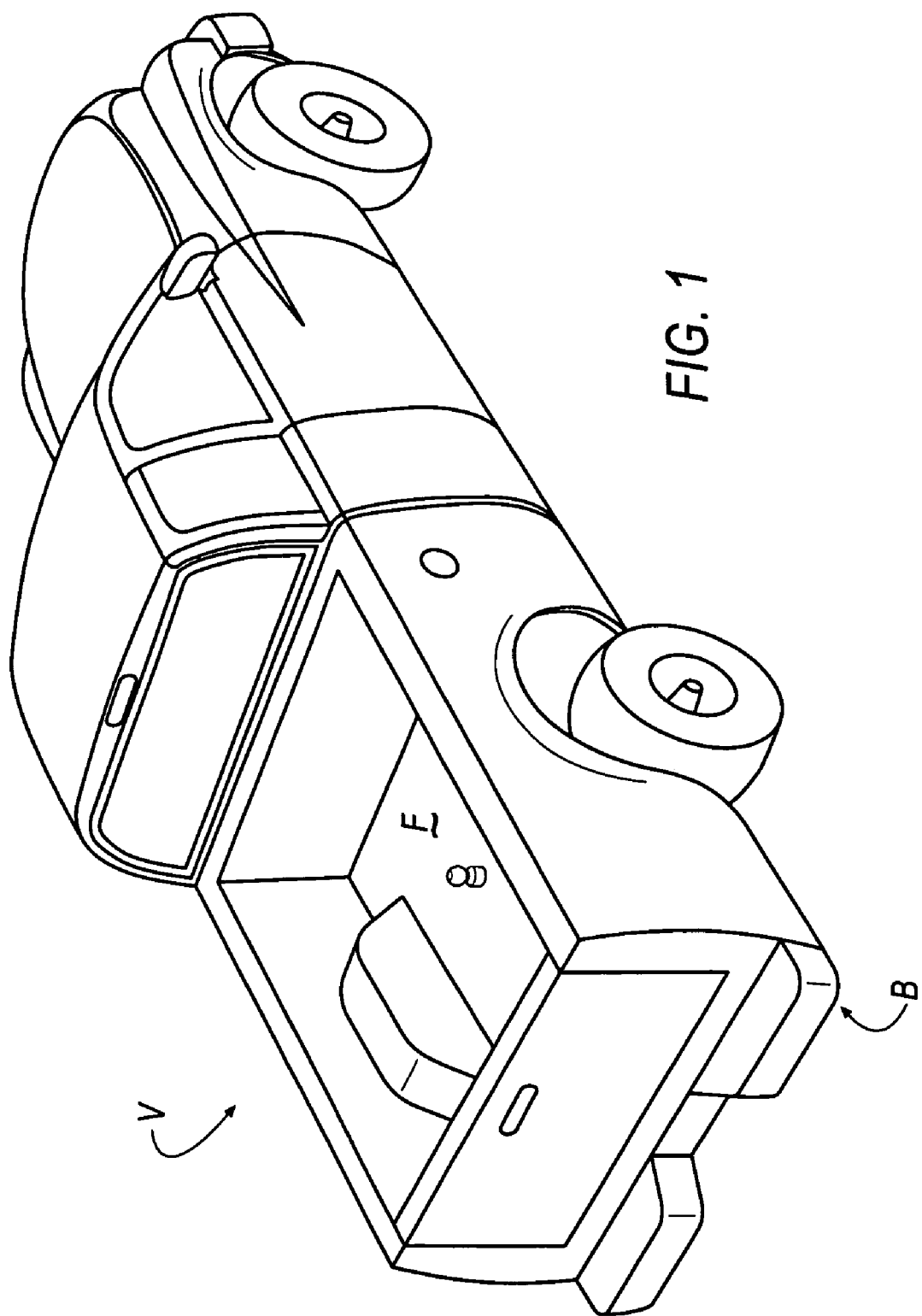
FIG. 1 is a perspective view of a hitch assembly secured to a vehicle according to an embodiment of the present invention.

Referring to FIG. 1, a vehicle V, such as a pickup truck, includes a hitch assembly 10 according to an embodiment of the present invention. The hitch assembly 10 is secured to the vehicle V. The present invention may be practiced with the hitch assembly 10 being mounted over or slightly forwardly of the rear axle into a pickup bed F of vehicle V, as a gooseneck hitch assembly.

Figure 2:
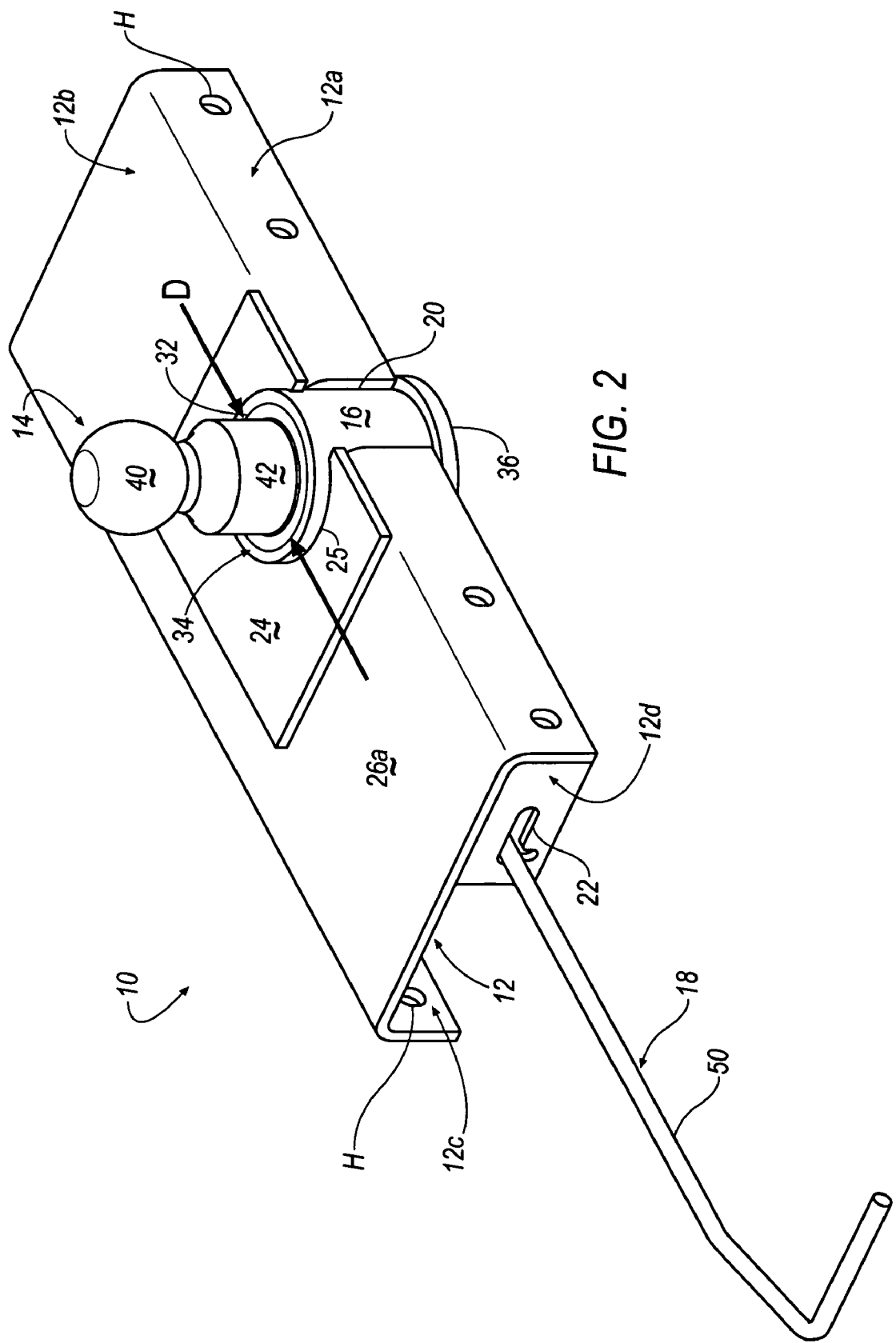
FIG. 2 is a perspective view of an isolated hitch assembly according to an embodiment of the present invention.
Figure 3:
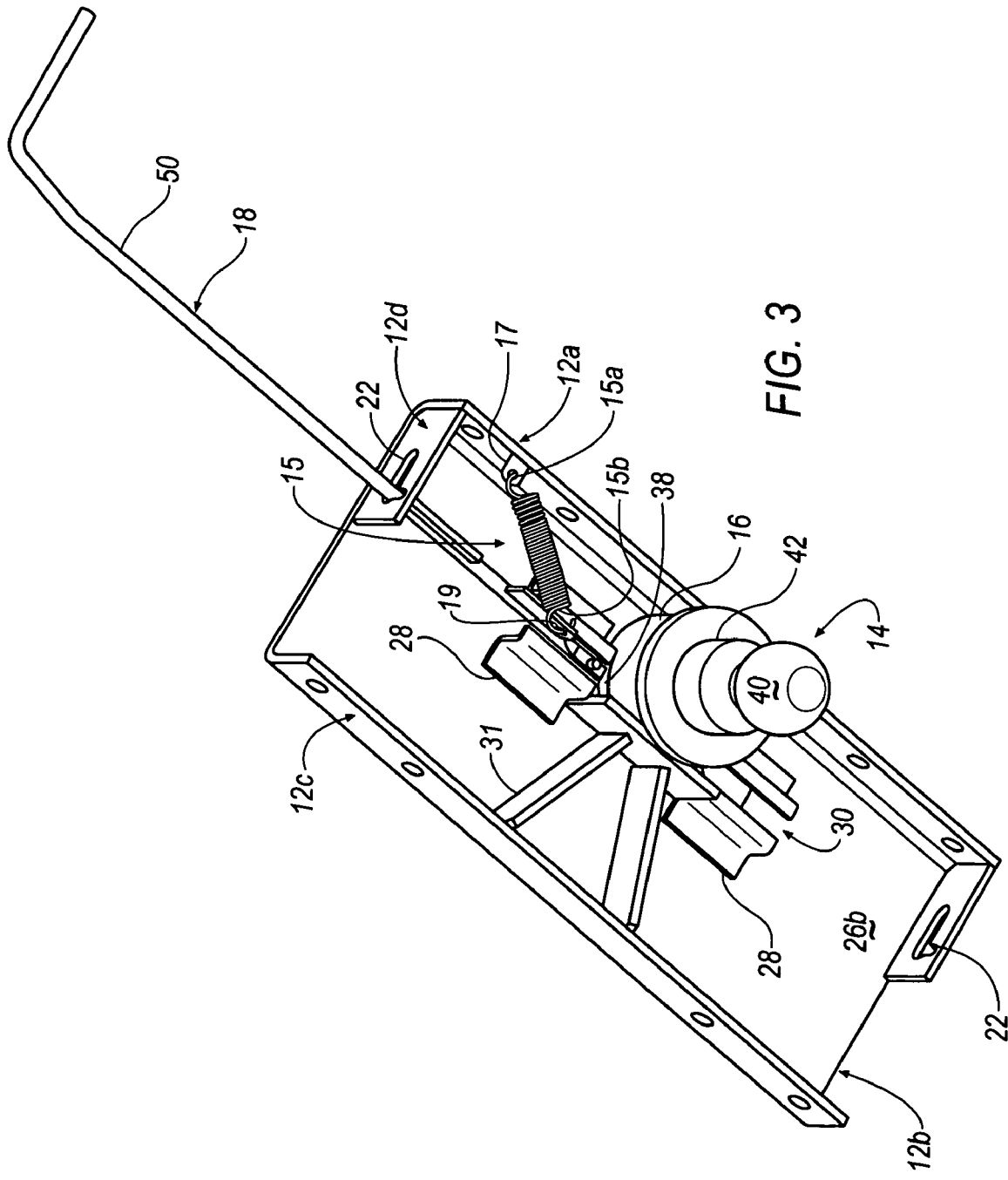
FIG. 3 is a perspective view illustrating the bottom of the isolated hitch assembly according to an embodiment of the present invention.

Referring to FIGS. 2 and 3, the hitch assembly 10 comprises a housing 12, a hitch ball 14, a socket 16, and a sliding bar assembly 18. The housing 12 includes walls 12a, 12b, 12c and 12d. Walls 12a, 12b and 12c form a substantially U-shaped configuration, while walls 12d share a boundary edge with walls 12a and 12b. Walls 12a and 12c include holes H for securing hitch assembly 10 onto vehicle V with a mounting system. While holes H are shown in the indicated locations, holes H may also be placed in other positions of the hitch assembly 10, such as on wall 12b. Hitch assembly 10 may be secured onto vehicle V by any conventional means, and preferably by bolts (not shown).

An aperture 20 extends between walls 12a and 12b. Walls 12d include an aperture 22 for sliding bar assembly 18 to pass through. The hitch assembly 10 of the present invention further includes a spring 15. A first end 15a of spring 15 is secured to a bottom edge of wall 12a through an eyelet 17. An opposing end 15b of spring 15 is secured to sliding bar assembly 18 through an eyelet 19. Sliding bar assembly 18 is shown in relation to one of walls 12d. It can also be installed in relation to opposing wall 12d to permit hitch assembly 10 to be used in different orientations.

A reinforcement plate 24 is preferably mounted to a top surface 26a of wall 12b. Reinforcement plate 24 may be mounted to top surface 26a by any conventional means known in the art. Reinforcement plate 24 includes an aperture 25 that aligns with aperture 20, and generally corresponds in shape to the portion of aperture 20 located on wall 12b. Brackets 28 are secured to the bottom surface 26b of wall 12b.

The brackets 28 may be secured by any conventional means, for example by welding, with bolts, or the like. Brackets 28 form a channel 30. Channel 30 guides sliding bar assembly 18 as sliding bar assembly 18 moves between positions, for example, between an engaged position and a retracted position. Once again, only one pair of brackets 28 are typically used at any one time.

A reinforcement structure 31 is secured to bottom surface 26b of wall 12b and provides additional strength to the hitch assembly 10. Reinforcement structure 31 is positioned between brackets 30 and abuts socket 16. Reinforcement structure 31 may be welded, bolted, or otherwise secured to bottom surface 26b of wall 12b and inside of wall 12c.

Socket 16 is positioned within apertures 20, 25 and secured to housing 12. Socket 16 may be secured to housing 12 through any conventional means, such as by welding, or the like. Socket 16 includes an aperture 32. Both socket 16 and aperture 32 are substantially cylindrical in shape. Aperture 32 extends vertically from a top surface 34 to a bottom surface 36 of socket 16 and has a diameter D. Socket 16 further includes a slot 38 located along a portion of the circumferential extent of the periphery of socket 16.

Figure 4:
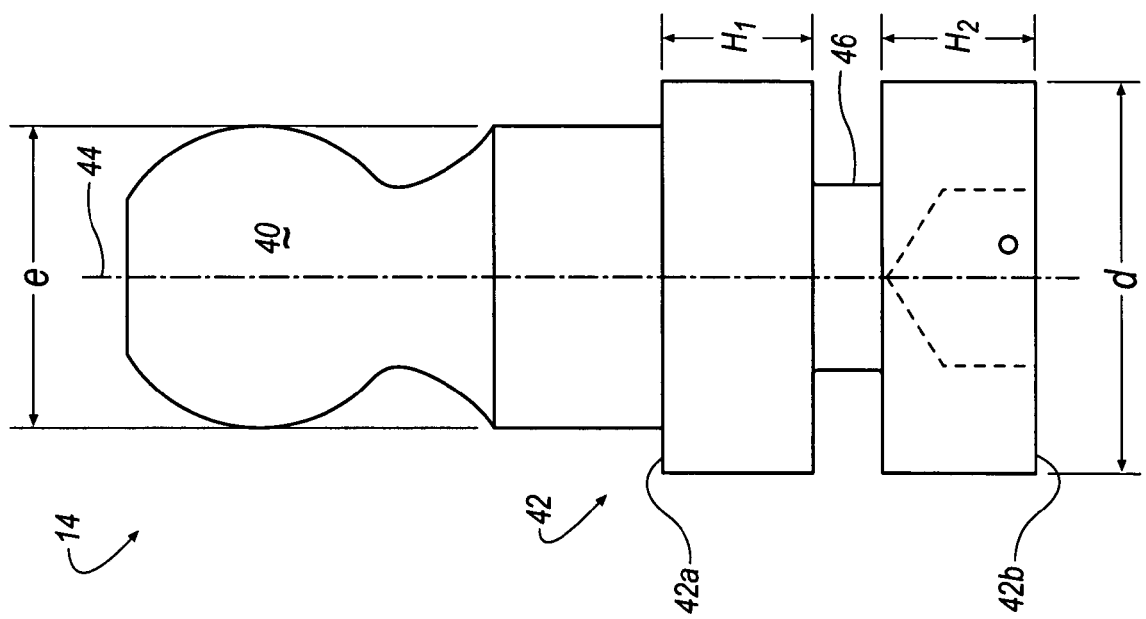
FIG. 4 is a side view of an isolated hitch ball according to an embodiment of the present invention.

Referring to FIG. 4, the hitch ball 14 includes an upper spherical portion 40 connected to a lower base 42. Hitch ball 14 is generally symmetrical about a vertical axis 44. As illustrated in the present invention, base 42 is generally substantially cylindrical and has a diameter d. A radial groove 46 is located about the entire circumference of the outer periphery of base 42. Radial groove 46 is positioned at a distance $H_1$ from a top surface 42a of base 42 and at a distance $H_2$ from a bottom surface 42b of base 42. Distance $H_1$ substantially equals distance $H_2$. The upper spherical portion 40 of hitch ball 14 has a maximum diameter e that is smaller than diameter d of base 42 and diameter D of aperture 32.

Aperture 32 of socket 16 selectively receives base 42 of hitch ball 14. Accordingly, diameter d of base 42 is slightly smaller than diameter D of aperture 32 so that hitch ball 14 may be slidably received within socket 16 as shown in the Figures. It should be noted that base 42 of hitch ball 14 should fit into aperture 32 of socket 16 such that hitch ball 14 does not slip though aperture 32.

Figure 5:
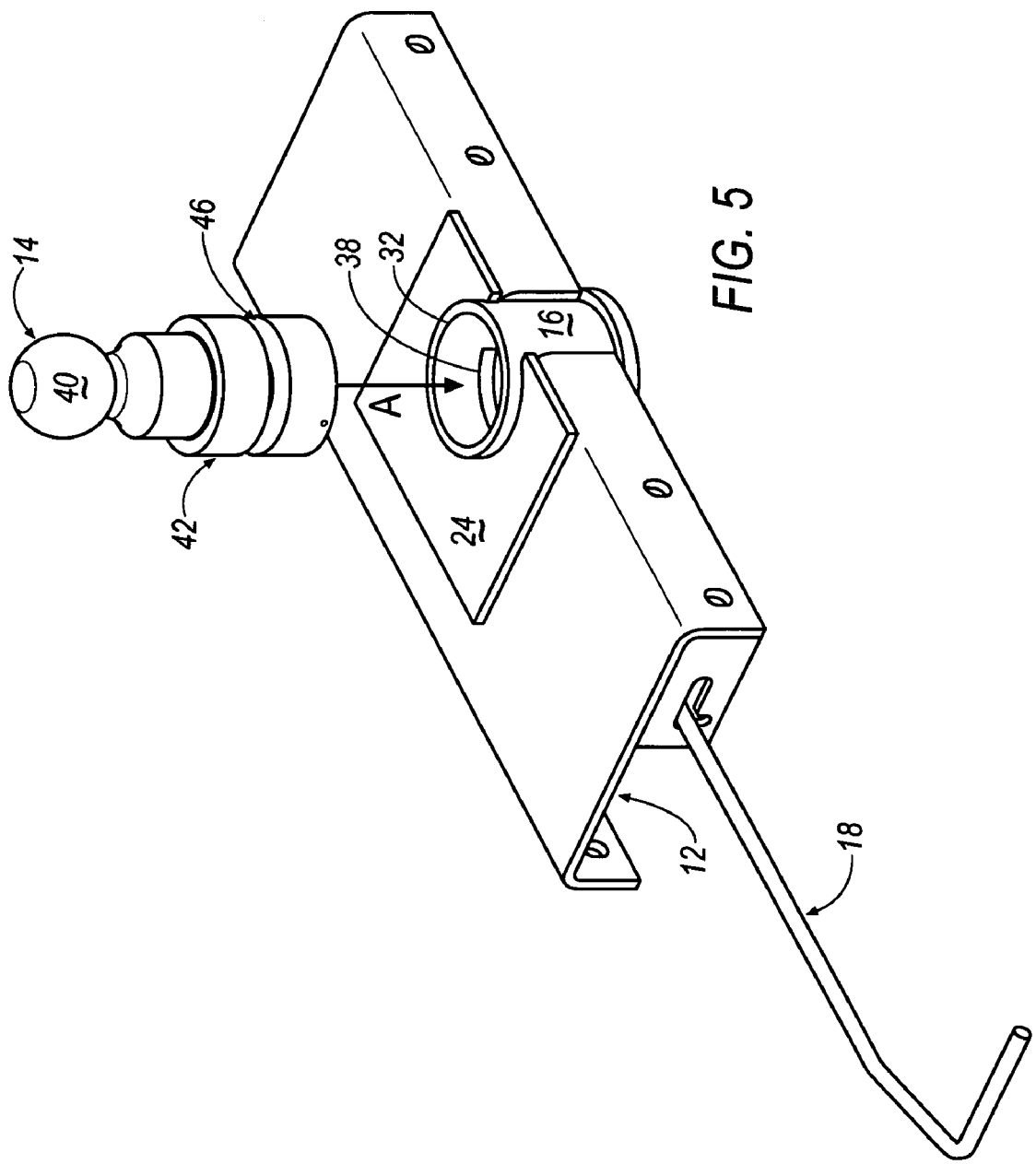
FIG. 5 is a perspective view of the uninstalled hitch ball in an upward position and the hitch assembly according to an embodiment of the present invention.
Figure 6:
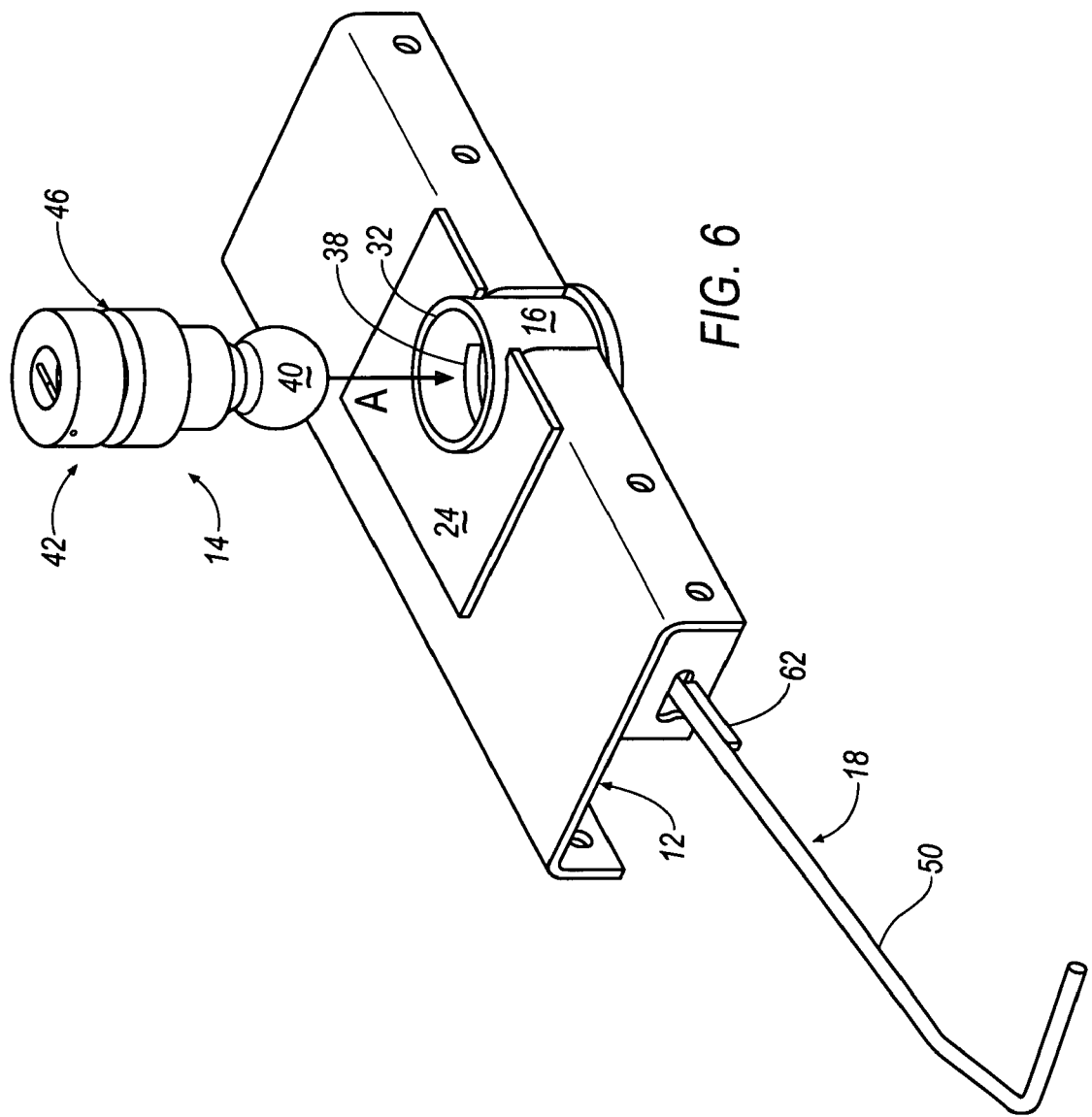
FIG. 6 is a perspective view of the uninstalled hitch ball in a downward position and the hitch assembly according to an embodiment of the present invention.

FIGS. 5 and 6 illustrate hitch ball 14 being inserted into aperture 32 of socket 16 in the direction of arrow A. FIG. 5 best illustrates hitch ball 14 being inserted into aperture 32 of socket 16 in an upward direction, or in a position for use. When hitch ball 14 is installed in the position for use, hitch ball 14 may be able to receive a conventional hitch assembly associated with a trailing object (not shown). FIG. 6 best illustrates hitch ball 14 being inserted into aperture 32 of socket 16 in a downward direction, or in a position for storage. When hitch ball 14 is installed in the position for storage, the upper spherical portion 40 of hitch ball 14 is inserted into aperture 32 of socket 16. As stated above, diameter e of upper spherical portion 40 is smaller than both diameter d of base 42 and diameter D of aperture 32 so upper spherical portion 40 may also be inserted into aperture 32 of socket 16. It may be desired to place hitch ball 14 into the position of storage when there is no trailing object associated with vehicle V. For example, with gooseneck hitch assemblies, when hitch ball 14 is in the position of storage, the bed F of the vehicle V may be used without any obstruction from hitch assembly 10.

Figure 7:
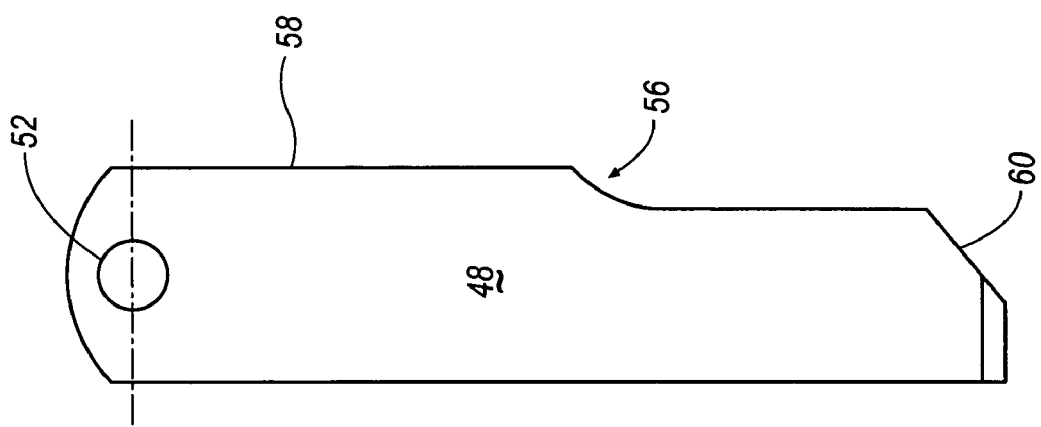
FIG. 7 is a side view of an isolated flat portion of a slide bar according to an embodiment of the present invention.

Referring to FIGS. 6-9, sliding bar assembly 18 includes a flat portion 48 and a handle 50. Handle 50 includes a projection 62. A hole 52 is located at one end of flat portion 48. Handle 50 is secured to flat portion 48 by a bolt 54 through hole 52. However, it can be appreciated that flat portion 48 and handle 50 may be secured by any conventional means. In an alternate embodiment, flat portion 48 and handle 50 may be of one unitary piece. FIG. 7 best illustrates flat portion 48 of sliding bar assembly 18. Flat portion 48 has a contour shape, including an indent 56, along a side 58 of flat portion 48. Side 58 terminates into an angle 60.

Figure 8:
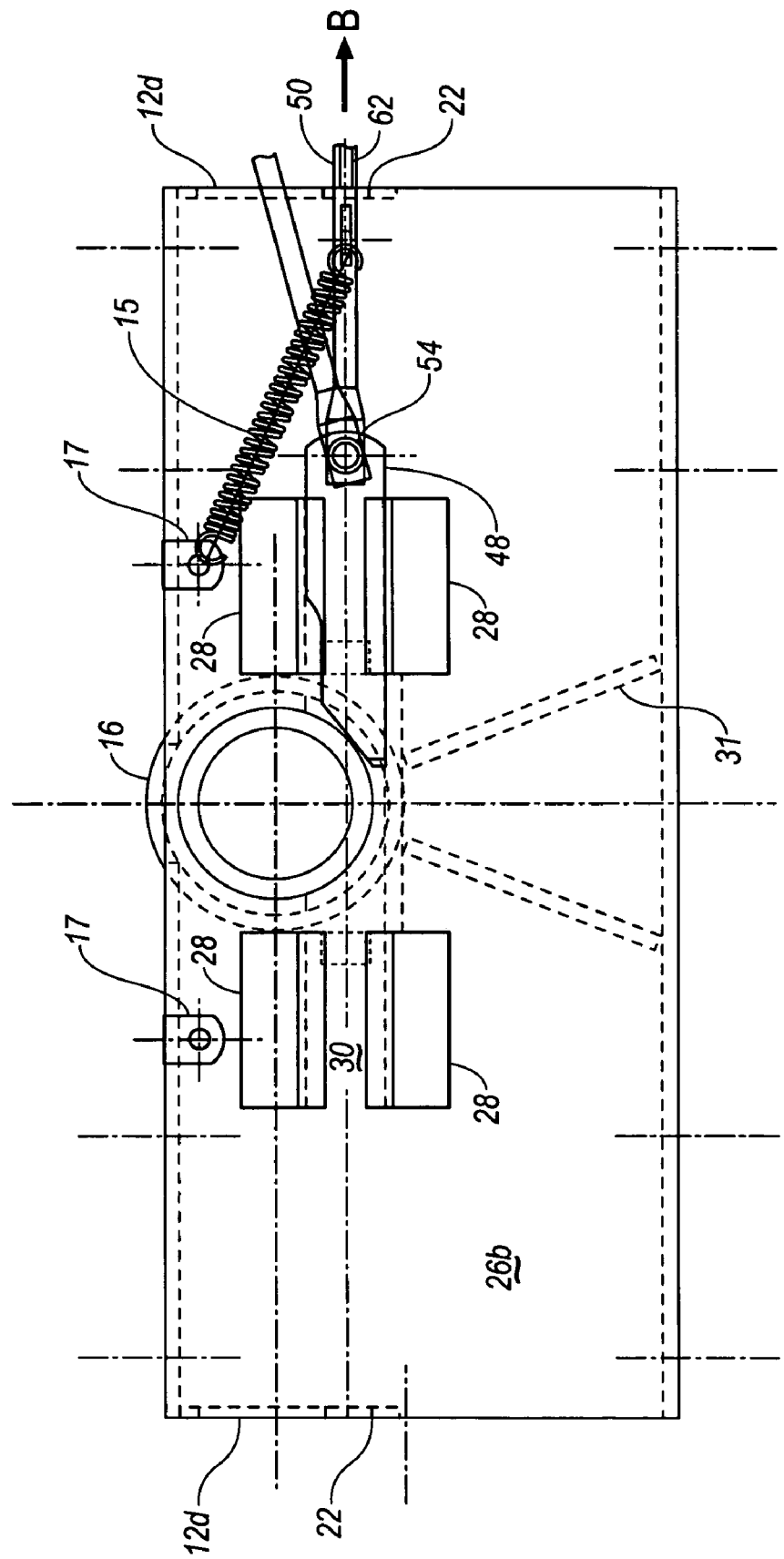
FIG. 8 is a bottom view of the hitch assembly illustrating the slide bar in a retracted position according to an embodiment of the present invention.
Figure 9:
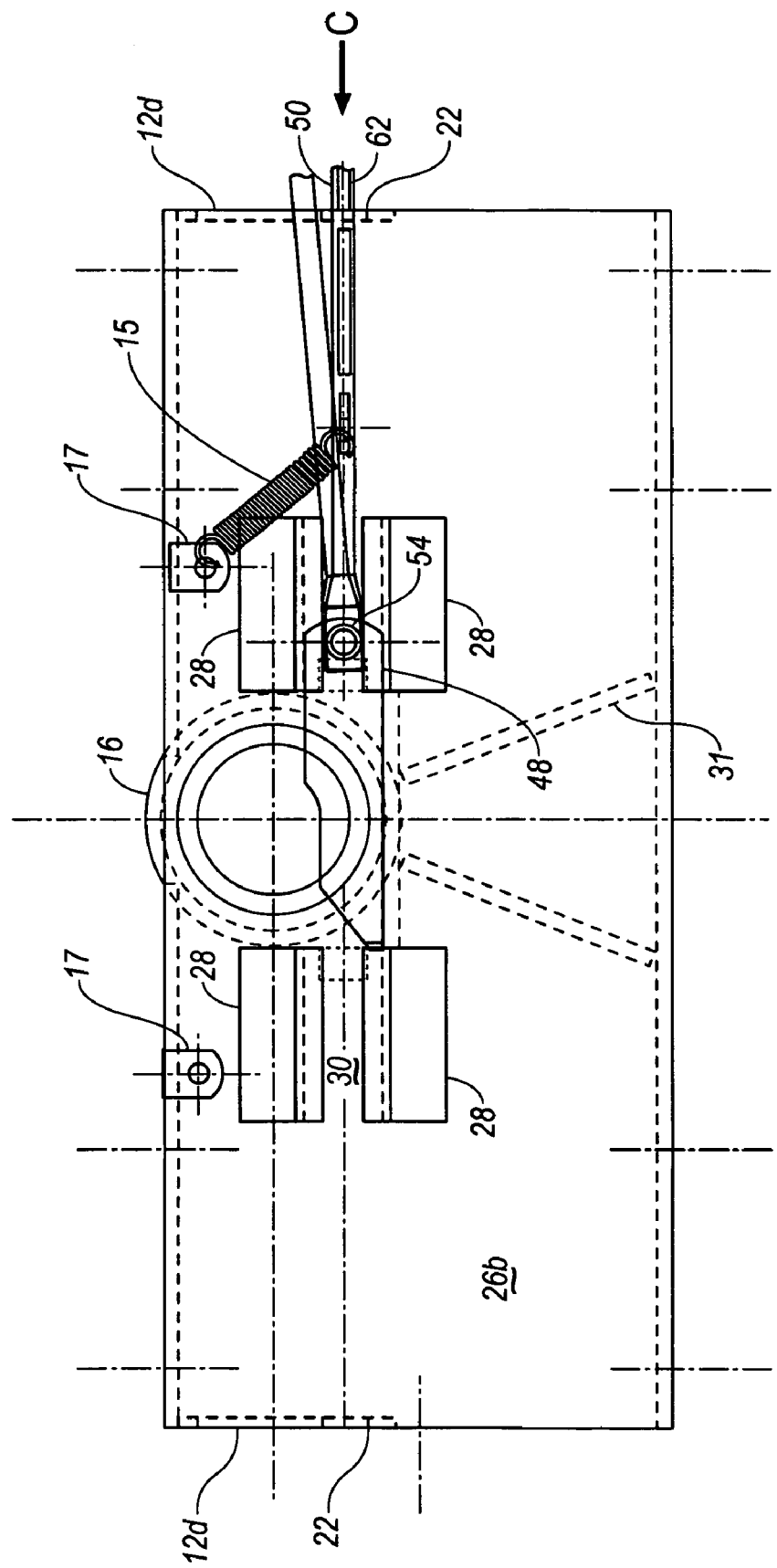
FIG. 9 is a bottom view of the hitch assembly illustrating the slide bar in an engaged position according to an embodiment of the present invention.

FIGS. 8 and 9 illustrate how hitch ball 14 is secured within socket 16. When installing hitch ball 14 within socket 16, sliding bar assembly 18 is pulled in the direction of arrow B, or away from socket 16. Sliding bar assembly 18 is pulled away from wall 12d until projection 62 on handle 50 passes through aperture 22. To counter the biasing force of spring 15, handle 50 is turned approximately 25 degrees after projection 62 clears aperture 22 so that projection 62 engages the outer periphery of wall 12d. Thereafter, the base portion 42 of hitch ball 14 may be inserted within socket 16. As stated above, hitch ball 14 may be inserted in an upward or downward direction. Once radial groove 46 of base portion 42 and slot 38 of socket 16 are aligned, handle 50 of sliding bar assembly 18 is turned back to the initial orientation so that projection 62 may again slide past aperture 22. Sliding bar assembly 18 may then be pushed in direction of arrow C. As sliding bar assembly 18 is pushed in direction of arrow C, spring 15 assists sliding bar assembly 18. Thus, sliding bar assembly 18 glides with minimal to no force in the direction of arrow C. As illustrated, slot 38 is sized to promote the engagement of sliding bar assembly 18 with radial groove 46. However, slot 38 is preferably not oversized since socket 16 needs to maintain appropriate strength during hitch operation.

Channel 30 guides sliding bar assembly 18 in the direction of arrows B and C. When sliding bar assembly 18 is pushed in the direction of arrow C, flat portion 48 of sliding bar assembly 18 passes through slot 38 of socket 16 and engages radial groove 46 of base 42. Angle 60 of flat portion 48 provides for a smooth transition as flat portion 48 initially engages radial groove 46 of base 42. The contoured shape of flat portion 48, including indent 56, allows sliding bar assembly 18 to fit within radial groove 46 of base 42 and maximizes the surface contact between sliding bar assembly 18 and radial groove 46. As a result, hitch assembly 10 is subject to reduced stress and provides a superior hitch assembly able to accommodate greater loads than conventional hitch assemblies. It should be noted that since distance $H_1$ and distance $H_2$ are substantially equal, sliding bar assembly 18 engages radial groove 46 independent of whether hitch ball 24 is installed for use or storage. Moreover, the engagement of sliding bar assembly 18 with hitch ball 14 does not limit the ability of hitch ball 14 to rotate within socket 16. Consequently, hitch ball 14 may still be able to rotate freely a complete 360 degrees about vertical axis 44.

In the illustrated embodiment, hitch ball 14 and socket 16 of the present invention are not located at the center of wall 12b, in contrast with conventional gooseneck hitch assemblies. As illustrated in the Figures, hitch ball 14 and socket 16 are offset from the center of wall 12b. Since both walls 12a and 12c have holes H, hitch assembly 10 may be secured to vehicle V in either a forward location or a rearward location. Additionally, as noted above, hitch assembly 10 may be practiced with sliding bar assembly 18 positioned on either the left hand side or the right hand side of housing 12 because both walls 12d have an aperture 22.

The hitch assembly 10 according to the present invention results in advantages over various existing hitch assemblies. For instance, the base of the hitch ball 14 and the socket 16 of the present invention are substantially cylindrical. As a result, hitch ball 14 may still able to rotate once inserted into socket 16. Moreover, rotation of hitch ball 14 is not restricted due to any pin engagement. Thus, while hitch ball 14 is secured within socket 16 by sliding bar assembly 18, hitch ball 14 may still able to rotate freely. Moreover, flat portion of sliding bar assembly 18 provides greater surface contact than the pin engagements of the conventional hitch assemblies. Further, since sliding bar assembly 18 can engage hitch ball 14 anywhere along radial groove 46 of hitch ball 14, positioning hitch ball 14 within socket 16 is greatly simplified.

Figure 10:
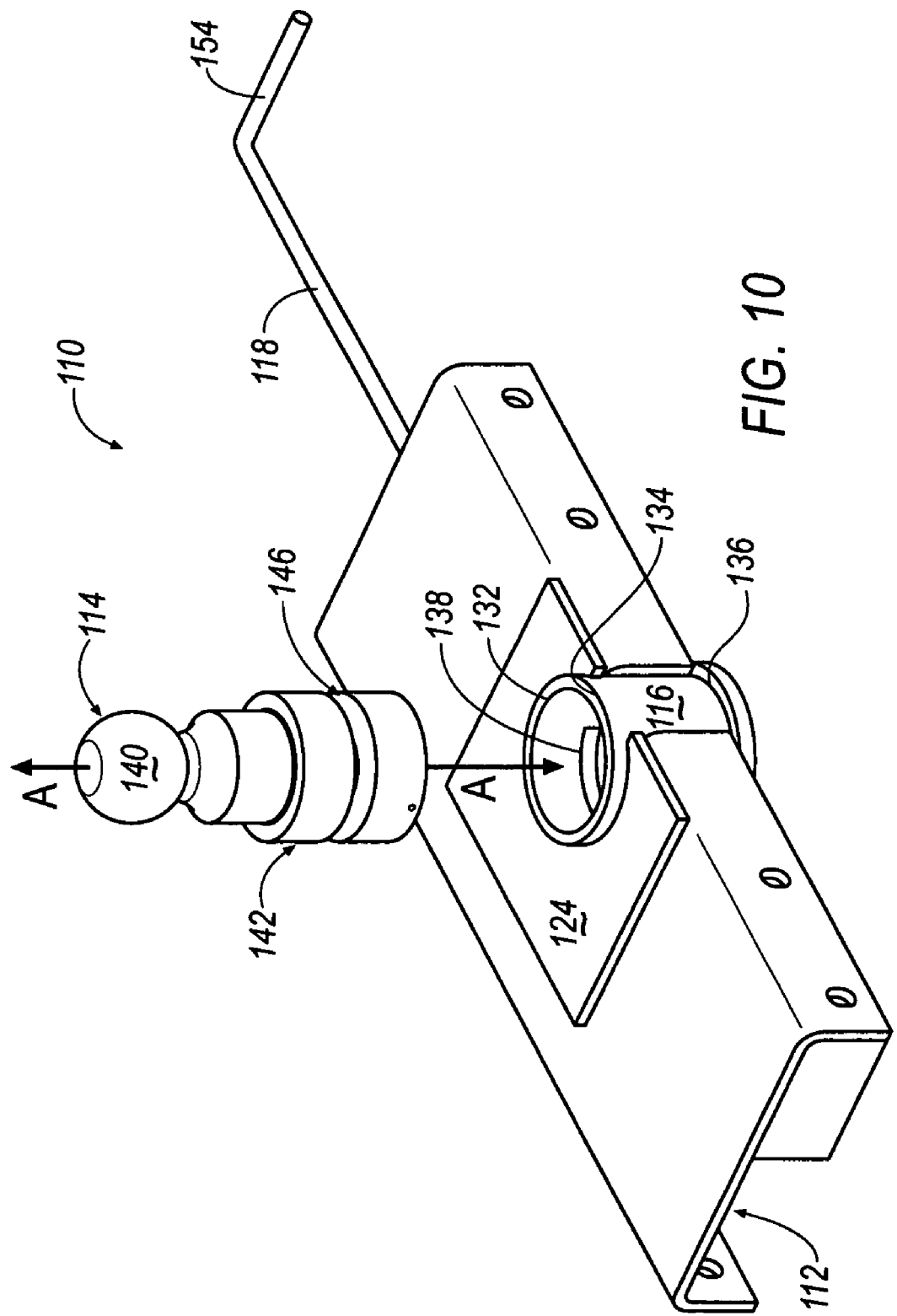
FIG. 10 a perspective view from above of an alternative embodiment of the hitch assembly of the present invention.

FIG. 10 illustrates an alternative embodiment of hitch assembly 10 as hitch assembly 110. The hitch assembly 110 comprises a housing 112, a hitch ball 114, a socket 116, a sliding bar assembly 118, and a reinforcement plate 124.

Socket 116 includes an aperture 132. Both socket 116 and aperture 132 are substantially cylindrical in shape. Aperture 132 extends vertically from a top surface 134 to a bottom surface 136 of socket 116. Socket 116 further includes a slot 138 located along a portion of the circumferential extent of the periphery of socket 116.

The hitch ball 114 includes an upper spherical portion 140 connected to a lower base 142. Hitch ball 114 is generally symmetrical about a vertical axis A-A. As illustrated, base 142 is generally substantially cylindrical. A radial groove 146 is located about the entire circumference of the outer periphery of base 142.

Figure 13:
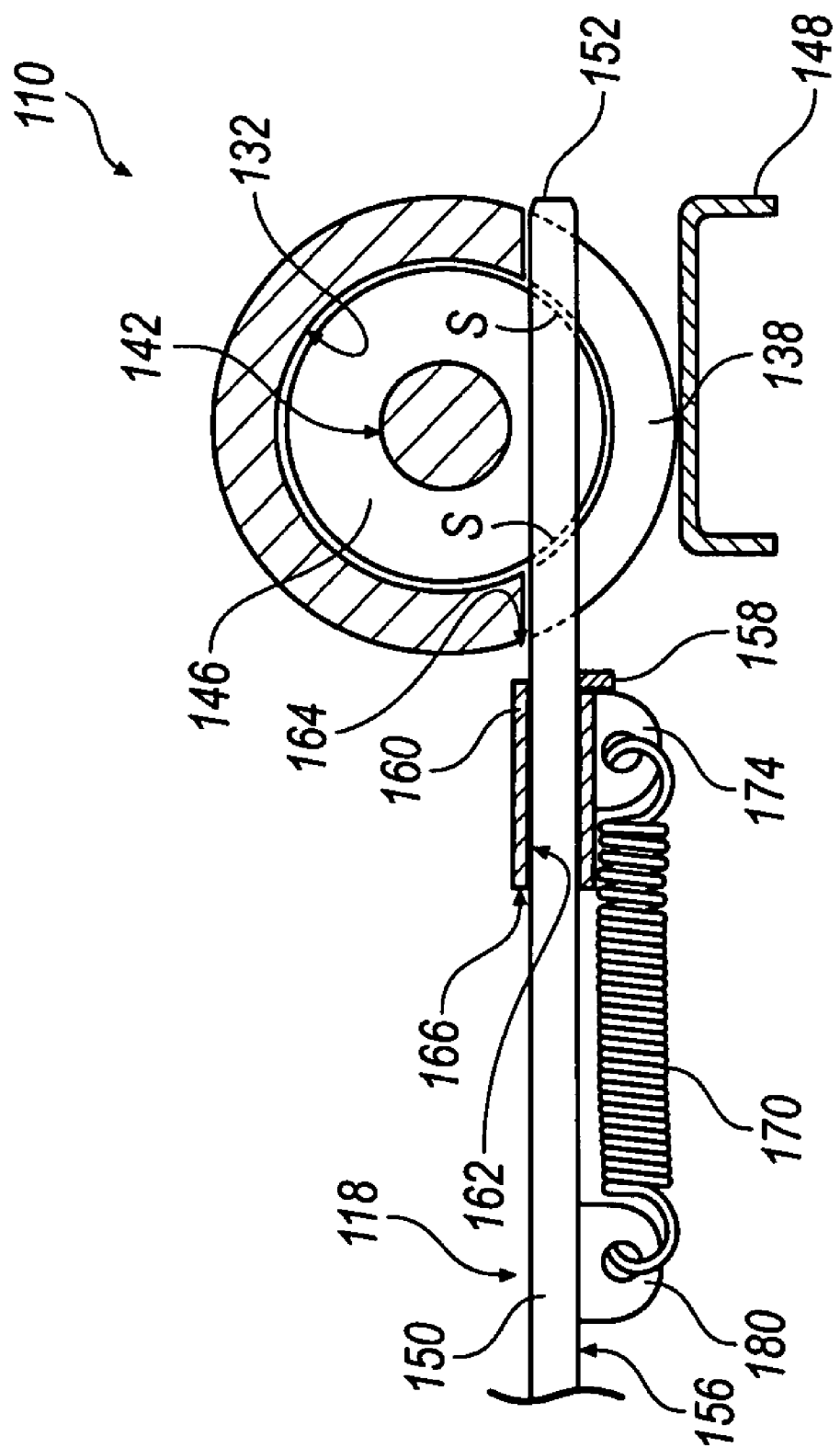
FIG. 13 is a partial sectional view taken along line 13-13 of FIG. 12.

Aperture 132 of socket 116 selectively receives base 142 of hitch ball 114. It should be noted that base 142 of hitch ball 114 should fit into aperture 132 of socket 116 such that hitch ball 114 does not slip though aperture 132. As best seen in FIG. 13, the interface I between base 142 and aperture 132 is circular.

The reinforcement plate 124 is preferably mounted to a top surface of housing 112. Reinforcement plate 124 may be mounted to the top surface by any conventional means known in the art.

With reference to FIGS. 11-13, hitch assembly 110 further includes a reinforcing member 148. Sliding bar assembly 118 includes a generally cylindrical sliding member 150, having an engaging end 152, a radially extending handle 154 (FIG. 10), and an outer surface 156. Generally cylindrical sliding member 150 has a guide pin 158 extending generally radially therefrom. Preferably, guide pin 158 and handle 154 extend in the same general radial direction from sliding member 150.

A sliding bar guide 160 is secured to the bottom surface of housing 112. The sliding bar guide 160 may be secured by any conventional means, for example by welding, with bolts, or the like. The sliding bar guide 160 has a generally cylindrical inner surface 162, a first axial end surface 164, a second axial end surface 166 and a guide slot 168. The sliding bar guide 160 guides sliding member 150 as sliding member 150 moves between positions, for example, between an engaged position (FIGS. 12, 13) and a retracted position (FIG. 11).

A spring 170 is secured at a first end 172 to sliding bar guide 160 through an eyelet 174. An opposing end 176 of spring 170 is secured to sliding bar assembly 118 through an eyelet 180. Spring 170 biases sliding member 150 toward the engaged position of FIG. 12.

As best seen in FIGS. 11-13, guide pin 158 will travel through guide slot 168 as sliding member 150 moves axially between the disengaged position and the engaged position. To move sliding bar assembly 118 from the disengaged position to the engaged position (FIG. 12), an operator will rotate handle 154 until guide pin 158 aligns with guide slot 168 (FIG. 11). Spring 170 will then urge sliding member 150 toward the engaged position. When sliding member 150 has translated axially within sliding bar guide 160, handle 154 may be rotated to ensure that guide pin 158 is not aligned with guide slot 168 (FIG. 12). Therefore, guide pin 158 prevents sliding member 150 from moving into the disengaged position as guide pin 158 will interfere the first axial end surface 164 of sliding bar guide 160. In the engaged position, sliding member 150 is interposed within radial groove 146 of hitch ball 114, retaining hitch ball 114 in socket 116.

To disengage sliding bar assembly 118, sliding member 150 is rotated until guide pin 158 aligns with guide slot 168. Handle 154 is pulled as guide pin 158 travels through guide slot 168. Once guide pin 158 has passed through guide slot 168, handle 154 may be rotated and released. When handle 154 is released, spring 170 will bias sliding member 150 toward the engaged position and guide pin 158 will interfere with the second axial end surface 166 of sliding bar guide 160 to prevent sliding member 150 from further axial translation toward the engaged position. In the disengaged position of FIG. 10, sliding member 150 is preferably completely removed from radial groove 146.

As best seen in FIG. 13, shear pullout of hitch ball 114 along axis A-A (FIG. 10) is resisted by a 'double shear' of sliding member 150. That is, sliding member 150 must be sheared in two different lines of section S for a failure that allows hitch ball 114 to pullout of socket 116. The total associated area of shear is represented in FIG. 13 by lines of shear S and is greater than twice the area of sliding member 150 taken normal to the axis of sliding member 150, since each line of shear S is curved due to the arcuate interface I between base 142 and aperture 132. Reinforcing member 148 provides a lateral restraint for sliding member 150 to resist deflection of sliding member 150 out of radial groove 146.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all articles and references, including patent applications and publications are incorporated herein by reference for all purposes.

What is claimed is:

1. A hitch assembly comprising:
    a generally cylindrical socket with an inner diameter and including a slot along an outer periphery of said socket;
    a hitch ball selectively received within said socket and having a radial groove about an outer periphery;
    a housing for receiving said socket;
    a sliding bar guide;
    a spring; and
    a generally cylindrical sliding member generally defined by an axis and including a spring attachment portion and a guide portion, wherein said sliding member is selectively guided by said sliding bar guide, said sliding member selectively engages said radial groove to retain said hitch ball within said socket, said sliding member is in double shear to resist pullout of said hitch ball, said spring selectively urges said sliding member to rotate generally about the axis, and said sliding member selectively disengages said radial groove to allow said hitch ball to be removed from said socket.

2. The hitch assembly of claim 1, wherein said sliding bar guide has a generally cylindrical inner surface that selectively contacts said sliding member.

3. The hitch assembly of claim 1, wherein said hitch ball selectively disengages said slot to release said hitch ball from said socket.

4. The hitch assembly of claim 1, wherein a lowermost portion of said hitch ball is adjacent to an upper surface of said housing to provide support to said hitch ball to complement support provided by said socket, when said hitch ball is in an installed position within said socket.

5. The hitch assembly of claim 4, wherein when said hitch ball is installed within said socket, both elements circumscribe a common axis of rotation, a terminal inner end point of both said slot and said groove being generally equally spaced from said axis of rotation.

6. The hitch assembly of claim 1, wherein said spring selectively urges said sliding member to translate generally parallel to the axis.

7. A hitch assembly comprising:
   a generally cylindrical socket with an inner diameter and including a slot along an outer periphery of said socket;
   a hitch ball selectively received within said socket and having a radial groove about an outer periphery;
   a housing for receiving said socket;
   a sliding bar guide; and
   a generally cylindrical sliding member including a spring attachment portion and a guide portion, wherein said sliding member is selectively guided by said sliding bar guide, said sliding member selectively engages said radial groove to retain said hitch ball within said socket, said sliding member selectively disengages said radial groove to allow said hitch ball to be removed from said socket, and wherein said sliding member is in double shear to resist pullout of said hitch ball.

8. The hitch assembly of claim 7, wherein said hitch ball selectively disengages said slot to release said hitch ball from said socket.

9. The hitch assembly of claim 7, further comprising a spring, wherein said spring selectively urges said sliding member to rotate generally about the axis.

10. The hitch assembly of claim 9, wherein said spring selectively urges said sliding member to translate generally parallel to the axis.

11. A hitch assembly comprising:
    a generally cylindrical socket with an inner diameter and including a slot along an outer periphery of said socket;
    a hitch ball selectively received within said socket and having a radial groove about an outer periphery;
    a housing for receiving said socket;
    a sliding bar guide having a guide slot formed therein;
    a generally cylindrical sliding member generally defined by an axis and including a guide pin extending from the axis, wherein said sliding member is selectively guided by said sliding bar guide between a hitch ball engaged position and a hitch ball disengaged position, said sliding member selectively engages said radial groove to retain said hitch ball within said socket, said sliding member selectively disengages said radial groove to allow said hitch ball to be removed from said socket, and wherein said guide pin is selectively translated within the guide slot as the sliding member translates generally axially within the sliding bar guide.

12. The hitch assembly of claim 11, further comprising a spring, wherein said spring selectively urges said sliding member to rotate generally about the axis.

13. The hitch assembly of claim 12, wherein, said spring selectively urges said sliding member to translate generally parallel to the axis.

14. The hitch assembly of claim 11, wherein the sliding bar guide includes a first axial end surface that selectively interferes with the guide pin to restrict axial translation of the sliding member toward the hitch ball disengaged position.

15. The hitch assembly of claim 11, wherein the sliding bar guide includes a second axial end surface that selectively interferes with the guide pin to restrict axial translation of the sliding member toward the hitch ball engaged position.

16. The hitch assembly of claim 11, wherein, said sliding member is in double shear to resist pullout of said hitch ball.

* * * * *